United States Patent [19]

Jacobson

[11] Patent Number: 5,071,676
[45] Date of Patent: Dec. 10, 1991

[54] ELECTROCONDUCTIVE PARTICLES AND METHOD FOR ADJUSTING THE ISOELECTRIC POINT THEREOF

[75] Inventor: Howard W. Jacobson, Wilmington, Del.

[73] Assignee: E. I. Du Pont de Nemours and Company, Wilmington, Del.

[21] Appl. No.: 545,042

[22] Filed: Jun. 28, 1990

Related U.S. Application Data

[62] Division of Ser. No. 388,921, Aug. 3, 1989, abandoned.

[51] Int. Cl.$^5$ .......................... B05D 7/00; H01B 1/06
[52] U.S. Cl. .................................... 427/214; 252/518; 252/520; 252/521; 427/215

[58] Field of Search ....................... 252/518, 520, 521; 428/403, 332, 333, 334, 341; 427/216, 214, 215, 217, 218

[56] References Cited

U.S. PATENT DOCUMENTS

| | | | |
|---|---|---|---|
| 4,373,013 | 2/1983 | Yoshizumi | 428/370 |
| 4,452,830 | 6/1984 | Yoshizumi | 427/215 |
| 4,655,966 | 4/1987 | Guillaumon et al. | 252/518 |

Primary Examiner—Josephine Barr
Attorney, Agent, or Firm—Charles E. Krukiel

[57] ABSTRACT

An electroconductive powder composition of antimony-containing tin oxide with an outer layer of hydrous metal oxide having an isoelectric point in the range from about 5 to 9.

1 Claim, 2 Drawing Sheets

ELECTROCONDUCTIVE PARTICLES AND METHOD FOR ADJUSTING THE ISOELECTRIC POINT THEREOF

This is a division of application Ser. No. 07/388,921, filed Aug. 3, 1989 now abandoned.

BACKGROUND OF THE INVENTION

The present invention relates to an improved electroconductive powder composition comprising tens of microns to sub-micron size particles each having a thin conductive coating layer which comprises a network of interconnecting crystallites of antimony-containing tin with an outer layer of a hydrous metal oxide, and, more particularly, the present invention relates to a method for adjusting the isoelectric point of such particles without substantially reducing the electroconductivity thereof by applying thereto a thin outer coating of a high isoelectric point hydrous metal oxide.

U.S. Pat. Nos. 4,373,013 and 4,452,830 describe an electroconductive powder in which a substrate of titanium dioxide particles are coated with a conducting layer of antimony-containing tin oxide. The powder is prepared by mixing an aqueous dispersion of titanium oxide particles with a solution containing a hydrolyzable tin salt and a hydrolyzable antimony salt. The coated titanium dioxide particles are recovered by filtration and then heated to improve crystallinity.

Copending U.S. patent application Ser. No. 07/245,183 describes an electroconductive composition which comprises antimony-containing tin oxide in which the tin oxide is predominantly crystalline, and the composition exists in a unique association with silica or a silica-containing material, such as a silicate. The composition is a powder which can be dispersed in a liquid carrier and applied to a surface as a thin film and, when dried, will render the thin film conductive.

A problem which has been encountered in practice with electroconductive pigments of the type comprising tiny particles of a substrate having an antimony-containing tin oxide conductive coating on each particle is in achieving a uniform dispersion of those particles in the carrier system of choice and then maintaining the stability of the dispersion over a period of time, e.g., during storage. Stability can be particularly important in connection with resin formulations for electroconductive paint systems. It has been found that stable dispersions of paint resins which incorporate an antimony-containing tin oxide based conductive pigment can be achieved when the isoelectric point of the pigment particles has a value in the range of from about 5 to about 9. The isoelectric point is significant because it represents the pH at which the surface of each particle has zero electrical charge, and, thereby, interactions of the individual particles with the resins of the paint system can be controlled.

SUMMARY OF THE INVENTION

The present invention is an electroconductive powder composition comprising tens of microns to micron size particles having a surface coating layer of antimony-containing tin oxide which is conducting and an outer thin layer of a hydrous metal oxide having a thickness of from a partial molecular layer to 5 monomolecular layers, i.e., from about 5 to 30 angstroms, and an isoelectric point in the range of from about 5 to 9. The present invention includes a method for adjusting the isoelectric point of such particles without substantially reducing their individual electroconductivity or their ability to form an interconnecting conductive network when dispersed in a carrier and applied on a surface as a thin film by applying to the particles a thin coating layer of a high isoelectric point hydrous metal oxide.

The hydrous metal oxide contemplated for use in the invention is an essentially non-conducting oxide selected from the group consisting of alumina, magnesia, zirconia and rare earth metal oxides. The hydrous metal oxide outer layer can be applied to the antimony-containing tin oxide layer by forming an aqueous slurry of the coated particles and adding a solution of a salt containing the desired metal thereto while controlling the pH of the resulting solution with either acid or base within the desired range of from about 5 to about 9.

Quite surprisingly, it is possible to adjust the isoelectric point of electroconductive particles whose conductivity, a predominantly surface property, is derived from a coating of antimony-containing tin oxide by applying thereto a very thin layer of an essentially non-conducting hydrous metal oxide without substantially reducing the conductivity of the original particle.

DETAILED DESCRIPTION OF THE INVENTION

Figure 1:
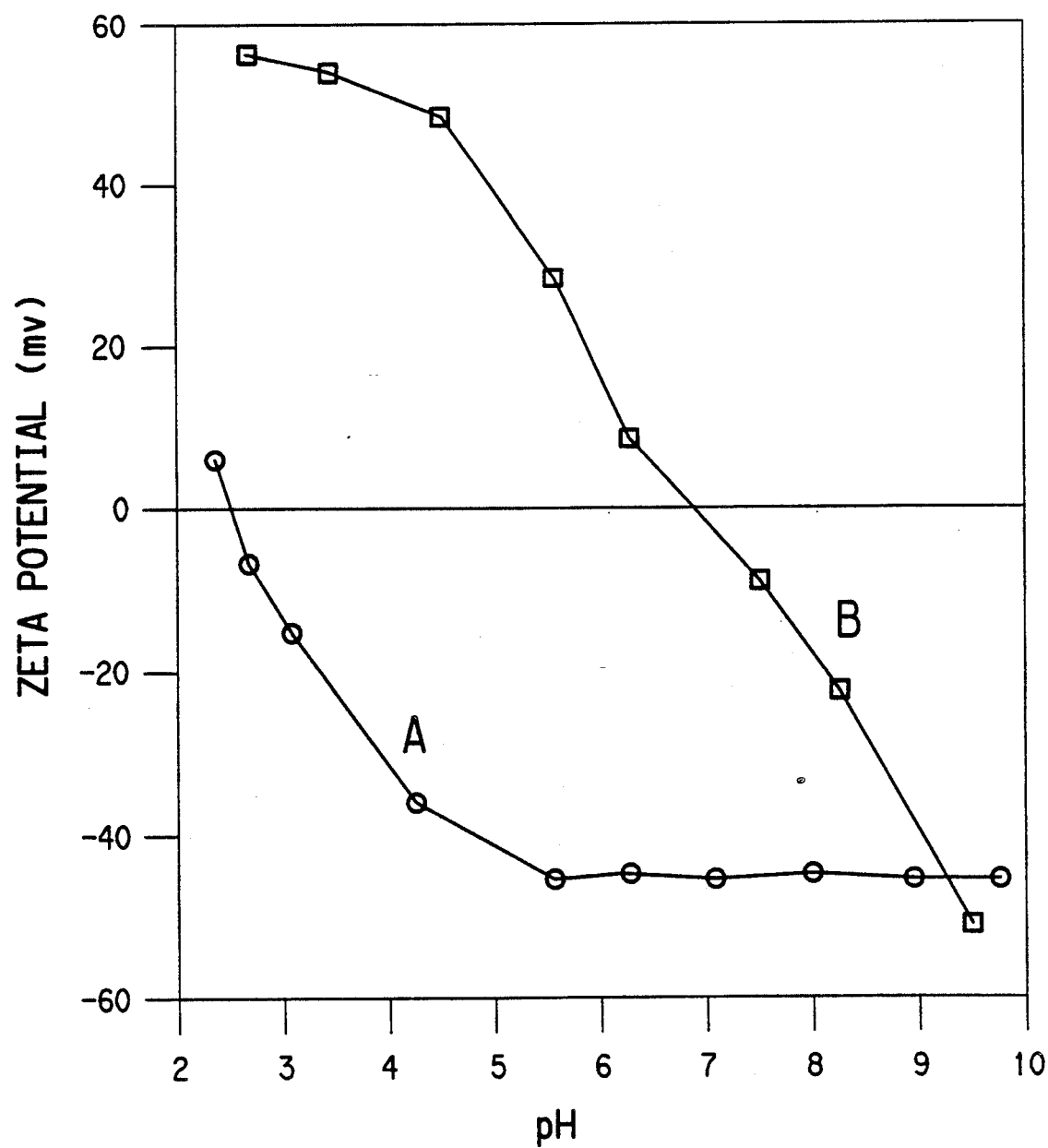
FIGS. 1 and 2 are graphs which compare zeta potential over a pH range of from 2 to 10 for aqueous dispersions of certain metal oxide-coated electroconductive particles according to the invention.

The present invention is an electroconductive powder composition in which the individual particles exhibit an isoelectric point in the range of from about 5 to 9 and which is made possible from a thin outer coating of a generally non-conducting hydrous metal oxide, i.e., a coating layer having a thickness of from about 1 to about 5 monomolecular layers, i.e., from about 5 to 30 angstroms. According to one embodiment of the invention, the coating layer can be as thin as a partial monomolecular layer.

The powder composition to which the invention is most applicable comprises tens of microns to micron size particles which are defined typically by a generally nonconducting substrate, such as, for example, titanium dioxide or amorphous silica, with a conducting layer of antimony-containing tin oxide. U.S. Pat. No. 4,373,013, the teachings of which are incorporated herein by reference, describes the preparation of an electroconductive powder in which titanium dioxide particles are used as nuclei, and their surfaces are coated with antimony-containing tin oxide. The shape of the particles comprising the powder is not particularly critical to the invention, and the material used as the substrate is also not critical to the invention. For example, the particles may be defined by an original core material having one or more coating layers, the last of which is an antimony-containing tin oxide conducting layer. The particles may also be formed from a substrate which is hollow, the preparation of which is described in greater detail in U.S. patent application Ser. No. 07/245,183, the teachings of which are incorporated herein by reference.

Typically, electroconductive powders of the type described herein are used as pigments or additives in coating systems, such as for antistatic conductive paperboard. The paperboard, in turn, is used for packaging electronic components and protecting them from latent or immediate failure from electrostatic discharge. Another important use for electroconductive powders is as a component of them pigment in automotive paint primer compositions in which application of the paint top coat to the automobile is by electrostatic spraying. A typical primer composition will contain ore or more solvents, resins, film forming binders, cross-linking agents and/or various components of pigment. By adjusting the isoelectric point of the particles to a value in the range of from 5 to 9 according to the invention, it is possible to reduce or control the interaction of the particles with other components of the primer and thereby improve the ability of the particles to remain uniformly dispersed within the composition. In paint systems where the pigment binders are catalyzed with acids or bases, for example, the isoelectric point of the pigment must be such as not to interfere significantly with the curing process.

The isoelectric point is a useful measure of surface charge, and values of from 6 to 8, and preferably a value of 7, has been found to be very desirable from the standpoint of paint formulation. By coating the electroconductive pigment particles with a generally high isoelectric point hydrous oxide, which is practically non-conducting, it is possible to preserve the electroconductivity of the particle while adjusting the isoelectric point of the particle from its typical range of from 1 to 3-4 to a value within the desired range of from 5 to 9.

The outer hydrous metal oxide layer can be applied to the antimony-containing tin oxide coated particle by adding a solution cf the salt which contains the desired metal to an aqueous slurry of the particles to be coated while controlling the pH of the slurry with either acid or base within the desired range. Metals contemplated for use according to the invention are those whose hydrous oxides have high isoelectric points, i.e., in the range of from 5 to 9 or 10. Magnesium and aluminum are examples of such metals; sodium aluminate is a preferred source of aluminum, and magnesium chloride is a preferred source of magnesium. Other salts which can be used according to the invention include chlorides, nitrates, and acetates. Where an acid salt is to be used as the source of metal, an alkali, such as sodium hydroxide or potassium hydroxide, can be added to the aqueous slurry as appropriate to maintain the pH within the desired range. If a basic salt is to be used as the source of metal, an acid, such as hydrochloric acid, can be added to the slurry to maintain the pH.

The hydrous metal oxide used in the invention is selected from the group consisting of alumina, magnesia, zirconia and rare earth metal oxides, with alumina and magnesia being preferred for reasons of ease of application with readily available chemicals. When sodium aluminate is used, the pH of the resulting slurry is preferably maintained in the range of 7.0 to 9.0, and when magnesium chloride is used, the pH of the resulting slurry is preferably maintained at from 7.0 to 10.0. Coating with hydrous metal oxide can be accomplished at room temperature, but preferably the temperature of the slurry during the coating process should be maintained in the range of from 60° to about 90° C. for reasons of optimum rates and reproducibility.

The method of the invention can conveniently be carried out by:
(a) forming an aqueous slurry of electroconductive powder particles to be coated in which the slurry has a resulting concentration of such particles in the range of from about 200 to 400 g/l and a temperature in the range of from about 60° to about 90° C.;
(b) adding an aqueous solution of a salt containing a hydrous metal oxide having an isoelectric point in the range of from 6 to 10 to said slurry while maintaining the pH of the resulting mixture in the range of from about 5 to 9, and preferably from about 6 to 8;
(c) maintaining the mixture until from a partial to about 5 monomolecular layers of metal oxide are deposited on the surface of said particles; and
(d) isolating the coated particles.

The thickness of the hydrous metal oxide coating is a function of salt concentration added to the coating bath and concentration of conductive powder particles in the bath. At a temperature of from 60° to 90° C. and a mixture pH in the range of from 7.0 to 10.0, the hydrous metal oxide will ordinarily be deposited on the surface of the particles at a rate of about one monolayer/30 minutes.

The newly coated particles can be isolated by any convenient solid-liquid separation procedure, such as, for example, by filtration, and then washed free of salts with water and dried. Drying is normally accomplished at temperatures up to about 120° C.

Figure 2:
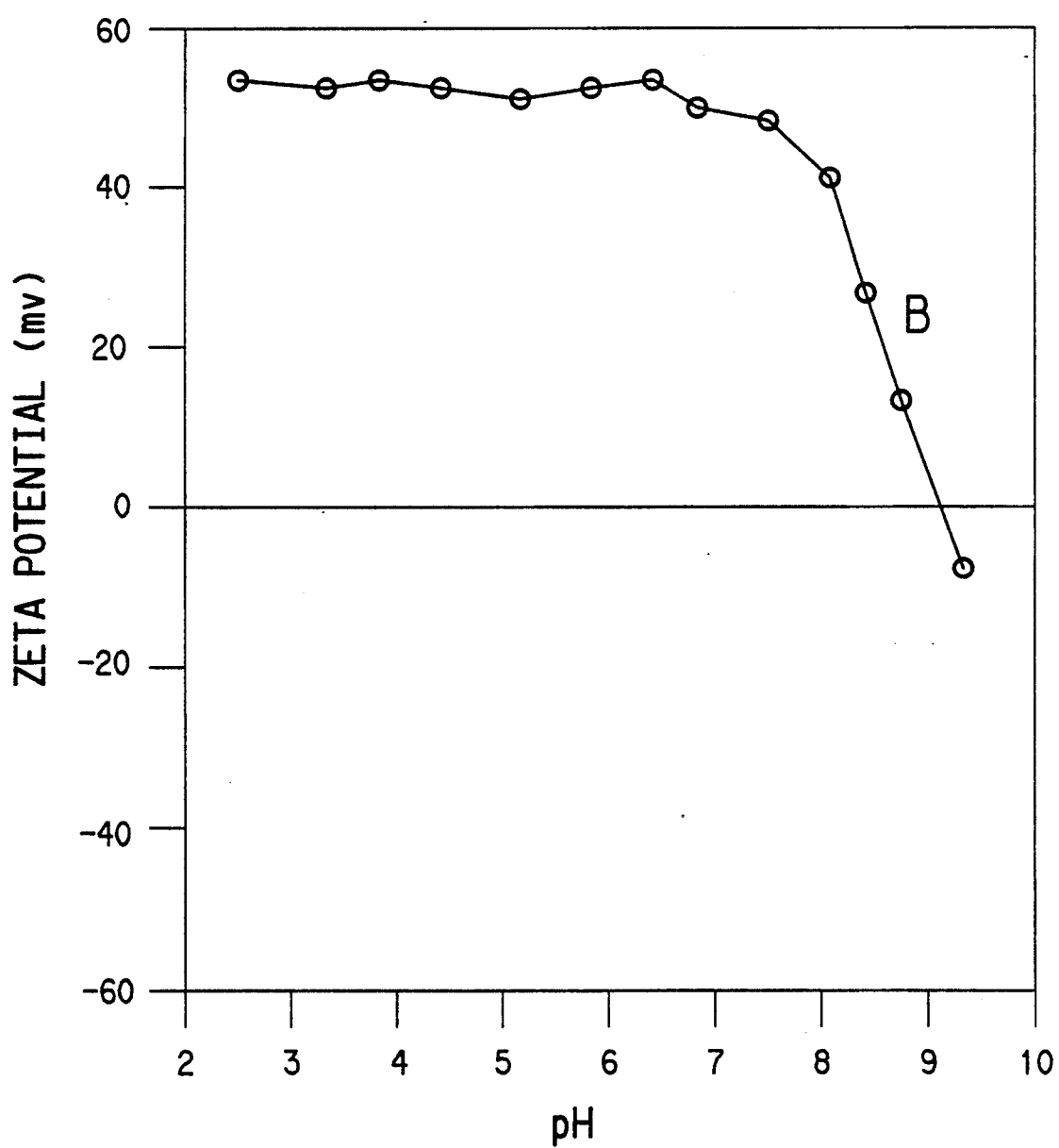

Referring now to the Figures, FIGS. 1 and 2 represent graphic plots of Zeta potential measurements on aqueous dispersions of electroconductive particles over a pH range of from 2 to 10. Curve "A" is a typical plot for electroconductive particles comprising a hollow amorphous silica shell coated with a conducting layer of antimony-containing tin oxide. The isoelectric point, i.e., where the Zeta potential is zero, occurs at pH 2.5. For identical particles which have been coated with an outer layer of hydrous aluminum oxide according to the invention, i.e., curve "B", the isoelectric point occurs at pH 7. FIG. 2 is a graphic plot of Zeta potential for the same silica shell particles, but having an outer coating layer according to the invention of magnesium oxide. The isoelectric point for these magnesium-coated particles occurs at pH of about 9.

The coated electroconductive powders of this invention are characterized by an enhanced isoelectric point which is typically in the range of from about 5 to 9, but preferably has a value of about 7. The isoelectric point for electroconductive particles based on antimony-containing tin oxide which are not coated according to the invention will typically range from 1 to about 3.0, but they can even be less than zero.

Isoelectric point measurements were made using an automated electrokinetics analyzer known as Pen Ken System 3000 and manufactured by Pen Kem, Inc., Bedford Hills, N.Y. The instrument measures the electrophoretic mobility of particles in a dilute suspension. Measurements are made at different pH levels and by graphically plotting the results, the isoelectric point, i.e., the pH at which Zeta potential is zero, can be found. The invention can be further illustrated by the following examples.

Ransburg units, i.e., surface conductivity, and dry powder resistivities were measured according to the method described in U.S. patent application Ser. No. 07/245,183, the teachings of which are incorporated herein by reference.

EXAMPLE 1

An electroconductive powder was prepared according to the following procedure:

(A) In an 18-liter, agitated polyethylene beaker, 3 liters of water were brought to a pH of 10.0 with NaOH. 100 g of potassium silicate (26.5% $SiO_2$) were added to form a solution. Thereafter, 1350 g of $CaCO_3$, which has previously been dispersed in 1 liter of water, were added. The slurry was heated to 90° C. in one-half hour by the introduction of steam, after which the pH was 9.9. Next, 1027 g of potassium silicate solution (26.5% $SiO_2$), predispersed in 1 liter of water, and 262 ml of nominal 37% HCl, diluted to 1 liter with water, were added simultaneously to the slurry over a period of 5 hours. The pH was maintained at 9.0 during the addition of the two solutions. The slurry was then digested at 90° C. for one-half hour, the pH was adjusted to 7.0 with hydrochloric acid, and, after sedimentation, the supernatant was decanted and the resulting mixture reheated to 90° C.

(B) Next, nominal 37% HCl was added until the pH reached 2.0. 1016 ml of an aqueous $SnCl_4$ solution containing the equivalent of 0.286 g $SnO_2$/ml, and 129 ml of an $SbCl_3$/HCl solution, containing the equivalent of 0.235 g Sb/ml, were combined and added to the slurry over a period of 2 hours simultaneously with sufficient 30% NaOH to maintain the pH of the slurry at 2.0. The slurry was digested at a temperature of 90° C. for one-half hour, and the resulting particles were filtered, washed with water to remove soluble salts, and then calcined at a temperature of 750° C. for 2 hours. The finished powder product had a dry powder resistance of 25 ohms. By X-ray fluorescence analysis, the powder was found to contain 46% Sn (as $SnO_2$), 47% Si (as $SiO_2$), 6% Sb (as $Sb_2O_3$) and 0.2% Ca (as CaO).

200 g of electroconductive powder prepared from the foregoing preparation procedure were then added to one liter of deionized water in a round bottom flask equipped with a stirrer to form a slurry which was then heated to 65° C. While stirring continuously, 15 ml of sodium aluminate solution containing 215 g $Al_2O_3$ per liter, were added dropwise over a period of one hour while the pH of the mixture was maintained between 8 and 8.5 by dropwise addition of 20% HCl. The sodium aluminate solution contained 215 g $Al_2O_3$ per liter. After addition of the sodium aluminate solution, the resulting mixture was stirred for an additional 30 minutes at a pH of 8.5 and a temperature of 65° C. to cure the hydrous metal oxide coating.

The coated product was recovered by filtration using a Buchner vacuum filter and washed with deionized water until free from soluble salts. No chloride ion was detected in the final wash water passing through the filter. The product was then air dried at 120° C for 6 hours. It was found to contain 1.5% $Al_2O_3$.

Isoelectric points (IEP) of the powders were determined using the automated electrokinetic analyzer, Pen Ken System 3000, described earlier. The IEP of the substrate, before applying the hydrous alumina coating, was 2.4. The IEP of the coated electroconducting powder was 7.5.

The coated powder had a dry electrical resistance of 100 ohms compared with 25 ohms for the powder prior to coating.

The powder was formulated with a test paint carrier at a pigment binder loading of 48/100 and applied to a test surface. The resulting dry paint film exhibited a surface conductivity of 160 Ransburg units, which was slightly less than the value cf 165 obtained for a formulation made using the powder prior to coating it with hydrous alumima.

Examples 2 and 3 were prepared as Example 1 with the difference that the amount of aluminate used was changed to give coatings corresponding to 0.75% and 3.0% $Al_2O_3$ based on the powder.

EXAMPLE 4

This Example illustrates the preparation of a powder consisting of hollow shell amorphous silica particles coated with crystallites of antimony-containing tin oxide to which a thin outer coating of hydrous magnesium oxide has been applied. The outer coating corresponds to 1.0 wt. % $Mg(OH)_x$ based on the powder.

200 g of the substrate powder used in Example 1 were added to 1500 ml cf deionized water in a round-bottom flask equipped with a stirrer, slurried and heated to 75° C. The pH was adjusted to 9.5 by the dropwise addition of 5% sodium hydroxide solution. Nine grams of $MgCl_2.6H_2O$ were dissolved in 50 ml of deionized water and this solution was added dropwise to the slurry over a period of 2 hours, maintaining the pH at 9.5 by the controlled addition of 5% sodium hydroxide solution. On completion of the addition of the magnesium chloride solution, the slurry was stirred for 30 minutes at a pH of 9.5 and a temperature of 75° C. to cure the coating.

The powder was recovered and dried as described in Example 1 and was found to contain 1.0 wt. % $Mg(OH)_x$. The isoelectric point of the substrate before applying the hydrous magnesia coating was 2.4, and after applying the coating it was 8.8.

The coated powder had a dry powder electrical resistance of 180 ohms compared with 25 ohms for the powder prior to coating. When formulated with a test paint carrier, as described in Example 1, the dry paint film surface conductivities were 140 and 165 Ransburg units, at 25 P/B and 48 P/B (P/B=powder/binder ratio), respectively.

Table 1 summarizes the results obtained on Examples 1 through 4.

TABLE 1

| Sample Description | Isoelectric Point | Powder Dry Resistance (Ohms) | Conductive Paint Film (Ransburg Readings) | |
|---|---|---|---|---|
| | | | 48 P/B | 25 P/B |
| Electroconducting Powder #120 | 2.4 | 25 | 165 | 160 |
| Example 1 #120 + 1.5% $Al_2O_3$ Coating | 7.5 | 100 | 160 | 140 |
| Example 2 #120 + 0.75% $Al_2O_3$ Coating | 6.7 | 40 | 165 | 155 |
| Example 3 #120 + 3.0% $Al_2O_3$ Coating | 8.0 | 380 | 150 | 130 |
| Example 4 #120 + 1.0% $Mg(OH)_x$ Coating | 8.8 | 180 | 165 | 140 |

I claim:

1. A method for adjusting the isoelectric point of electroconductive powder particles, each particle consisting essentially of a substrate having a conductive coating layer which comprises a network of interconnecting crystallites of antimony-containing tin oxide, according to the following steps:

(a) forming an aqueous slurry of said powder particles to be coated in which the slurry has a resulting concentration in the range of from about 200 to 400 g/l and a temperature in the range of from ambient to about 90° C.;
(b) adding an aqueous solution of a salt containing a hydrous metal oxide which is an essentially non-conducting oxide selected from the group consisting of alumina, magnesia, zirconia, titania and cerium and having an isoelectric point in the range of from 6 to 10 to said slurry while maintaining the pH of the resulting mixture in the range of from about 5 to 9;
(c) maintaining the mixture until from a partial molecular layer to about 5 monomolecular layers of metal oxide are deposited on the surface of said particles; and
(d) isolating the particles.

* * * * *